(12) United States Patent
Lee et al.

(10) Patent No.: US 9,311,522 B2
(45) Date of Patent: Apr. 12, 2016

(54) APPARATUS AND METHOD FOR IMPROVING FACE RECOGNITION RATIO

(75) Inventors: Seung-yun Lee, Suwon-si (KR); I-saac Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1109 days.

(21) Appl. No.: 12/719,938

(22) Filed: Mar. 9, 2010

(65) Prior Publication Data
US 2011/0033092 A1  Feb. 10, 2011

(30) Foreign Application Priority Data
Aug. 5, 2009  (KR) .................. 10-2009-0072120

(51) Int. Cl.
G06K 9/18 (2006.01)
G06K 9/00 (2006.01)
H04N 5/232 (2006.01)

(52) U.S. Cl.
CPC ........ G06K 9/00228 (2013.01); H04N 5/23219 (2013.01); H04N 5/23293 (2013.01)

(58) Field of Classification Search
CPC ................................................. G06K 9/00315
See application file for complete search history.

(56) References Cited

U.S. PATENT DOCUMENTS

| 8,045,013 | B2 | 10/2011 | Abe | |
|---|---|---|---|---|
| 2002/0163572 | A1* | 11/2002 | Center et al. | 348/14.08 |
| 2004/0101212 | A1* | 5/2004 | Fedorovskaya et al. | 382/305 |
| 2005/0078221 | A1* | 4/2005 | Kobayashi | 348/600 |
| 2005/0276469 | A1* | 12/2005 | Kim | 382/159 |
| 2007/0002157 | A1* | 1/2007 | Shintani et al. | 348/333.06 |
| 2008/0037841 | A1* | 2/2008 | Ogawa | 382/118 |
| 2008/0240563 | A1* | 10/2008 | Takano | H04N 5/23219 382/173 |
| 2008/0246852 | A1* | 10/2008 | Mori | 348/222.1 |
| 2008/0252745 | A1* | 10/2008 | Nakamura | 348/222.1 |
| 2009/0220160 | A1* | 9/2009 | Nara | 382/209 |
| 2010/0026834 | A1* | 2/2010 | Hong | 348/222.1 |

FOREIGN PATENT DOCUMENTS

| JP | 2008-311819 A | 12/2008 |
|---|---|---|
| JP | 2009-017215 A | 1/2009 |

OTHER PUBLICATIONS

Oliver, Nuria, Alex Pentland, and Francois Berard. "LAFTER: a real-time face and lips tracker with facial expression recognition." Pattern recognition 33.8 (2000): 1369-1382. 14 pages.*
Office Action issued for KR 10-2009-0072120 (Jun. 2, 2015).

* cited by examiner

*Primary Examiner* — Sumati Lefkowitz
*Assistant Examiner* — Ryan P Potts
(74) *Attorney, Agent, or Firm* — Drinker Biddle & Reath LLP (57) ABSTRACT

An apparatus for improving a face recognition ratio includes a digital signal processing unit which generates a first image having a size different from that of a live-view image and, when the size of a face detected from the first image is smaller than a reference size, maps information about the face detected from the first image on the live-view image and performs smile and/or blink recognition.

11 Claims, 6 Drawing Sheets

APPARATUS AND METHOD FOR IMPROVING FACE RECOGNITION RATIO

CROSS-REFERENCE TO RELATED PATENT APPLICATIONS

This application claims the benefit of Korean Patent Application No. 10-2009-0072120, filed on Aug. 5, 2009, in the Korean Intellectual Property Office, the disclosure of which is incorporated herein in its entirety by reference.

BACKGROUND

The present invention relates to a digital image processing apparatus and method, and more particularly, to an apparatus and method for improving a face recognition ratio so that an image photographing success rate may be improved.

Recently, a smile shot for automatically photographing an image when one smiles and a blink shot for automatically photographing an image when one does not blink by detecting a blink of an eye during photographing are provided as basic functions in general digital image processing apparatuses.

Figure 7A:
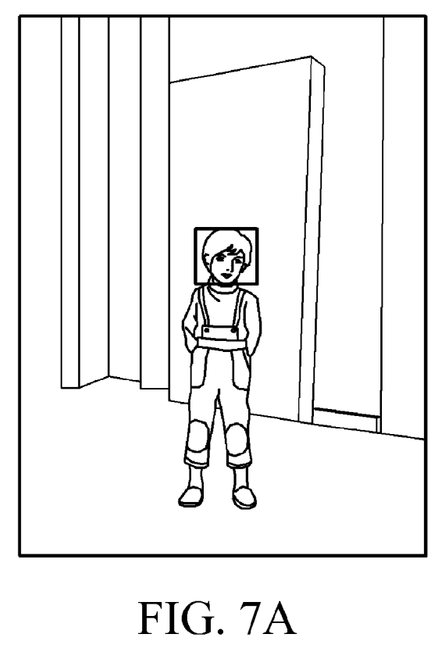
FIGS. 7A and 7B are images respectively generated by a wide-angle lens and a normal lens.
Figure 7B:
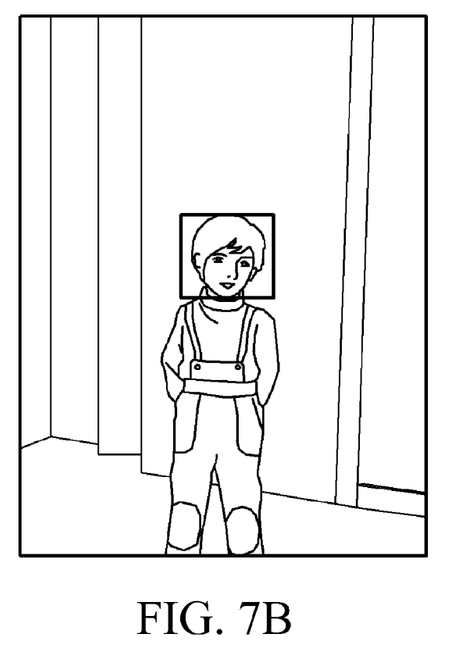

As users prefer a wider viewing angle in the digital image processing apparatus, a wide-angle lens, as well as a high performance zoom lens, is mounted on recently released digital image processing apparatus. For a subject located at the same distance, the subject in an image photographed by a digital image processing apparatus using a wide-angle lens, as illustrated in FIG. 7A, appears to be smaller than one in an image photographed by a digital image processing apparatus using a normal lens, as illustrated in FIG. 7B.

In the digital image processing apparatus with the wide-angle lens, since an image appears to be smaller, a face recognition ratio with respect to a small face is deteriorated and a smile and/or blink are difficult to detect.

SUMMARY

To solve the above and/or other problems, the present invention provides an apparatus and method for improving a face recognition ratio by making detection of a smile and/or blink easy so that an image photographing success rate may be improved.

According to an aspect of the present invention, an apparatus for improving a face recognition ratio includes a digital signal processing unit which generates a first image having a size different from that of a live-view image and, when the size of a face detected from the first image is smaller than a reference size, maps information about the face detected from the first image on the live-view image and performs at least one of a smile and blink recognition.

The digital signal processing unit may include a resize unit that resizes an image into the first image having a size smaller than that of the live-view image, a face detection unit that detects a face from the first image and calculates coordinates of the detected face and coordinates of a characteristic of the face, and a control unit mapping the information about the face detected from the first image on the live-view image and performing at least one of smile and blink recognition from the live-view image, when the detection of a smile and/or blink from the first image is impossible.

The apparatus may further include a database which stores at least one of face detection information, smile detection information, and blink detection information.

The control unit may perform smile and/or blink recognition by comparing a face of the live-view image mapped with the coordinates of a face and a characteristic of the first image, with information about detection of at least one of a smile and blink stored in the database.

According to another aspect of the present invention, an apparatus for improving a face recognition ratio includes a digital signal processing unit which generates at least two images having sizes different from that of a live-view image and, when the size of a face detected from one of the generated images is smaller than a reference size, displays a face detected from the other one of the generated images and performs at least one of a smile and blink recognition.

The size of a face detected from one of the generated images may be larger than or equal to the reference size, the digital signal processing unit displays the face detected from one of the generated images and performs the at least one of the smile and blink recognition.

The digital signal processing unit may include a resize unit that resizes an image into the first image having a size smaller than that of the live-view image and into a second image having a size smaller than that of the first image, a face detection unit that detects a face from the images and calculates coordinates of the detected face and coordinates of a characteristic of the face, and a control unit that displays a face detected from the first image in the live-view image when the size of a face detected from the second image is smaller than the reference size, and the face detected from the second image in the live-view image when the size of a face detected from the second image is larger than or equal to the reference size, and performing the at least one of the smile and blink recognition.

The control unit may display the face detected from the first or second image by overlapping the detected face on the face of the live-view image.

The control unit may display the face detected from the first or second image in an area of the live-view image.

The apparatus may further include a database which stores at least one of face detection information, smile detection information, and blink detection information.

The control unit may perform the at least one of the smile and blink recognition by comparing coordinates of a face and a characteristic of the first or second image displayed on the live-view image, with information about detection of a smile and/or blink that is previously stored in the database.

According to another aspect of the present invention, a method for improving a face recognition ratio includes generating a first image having a size different from that of a live-view image, and performing at least one of a smile and blink recognition by mapping information about a face detected from the first image on the live-view image when the size of a face detected from the first image is smaller than a reference size.

In the performing of the at least one of the smile and blink recognition by mapping information about a face detected from the first image on the live-view image, the at least one of the smile and blink recognition may be performed by comparing a face of the live-view image mapped with the coordinates of a face and a characteristic of the first image, with information about detection of at least one of a smile and blink stored in the database.

According to another aspect of the present invention, a method for improving a face recognition ratio includes generating at least two images having sizes different from that of a live-view image, and performing at least one of a smile and blink recognition by displaying a face detected from one of the generated images when the size of a face detected from the other one of the generated images is smaller than a reference size, and performing the at least one of the smile and blink recognition by displaying a face detected from the other one of the generated images when the size of a face detected from the other one of the generated images is smaller than a reference size The face detected from the generated image may be displayed by being overlapped on the face of the live-view image.

The face detected from the generated image may be displayed in an area of the live-view image.

The at least one of the smile and blink recognition may be performed by comparing the coordinates of a face and a characteristic of the generated image displayed on the live-view image with information about detection of at least one of a smile and blink that is previously stored.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

The attached drawings for illustrating exemplary embodiments of the present invention are referred to in order to gain a sufficient understanding of the present invention, the merits thereof, and the objectives accomplished by the implementation of the present invention. Hereinafter, the present invention is described in detail by explaining exemplary embodiments of the invention with reference to the attached drawings. Like reference numerals in the drawings denote like elements.

Figure 1:
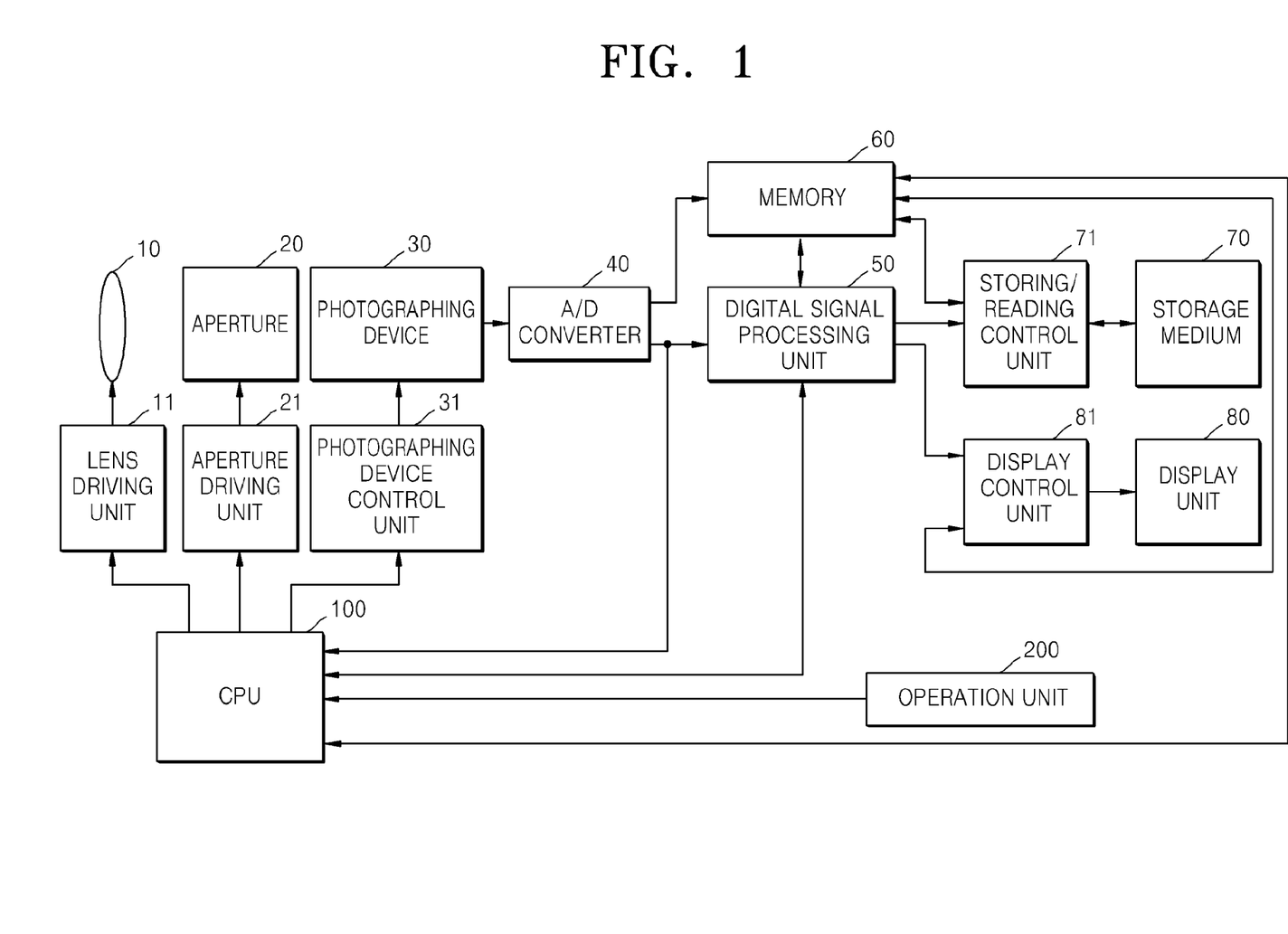
FIG. 1 is a block diagram illustrating the configuration of an apparatus for improving a face recognition ratio according to an embodiment of the present invention.

FIG. 1 is a block diagram illustrating the configuration of an apparatus for improving a face recognition ratio according to an embodiment of the present invention. In particular, FIG. 1 schematically illustrates a digital photographing apparatus as a sort of the digital image processing apparatus for improving a face recognition ratio. The present invention is not limited to the digital image processing apparatus as illustrated in FIG. 1 and may be applied to image processing apparatuses such as personal digital assistants (PDAs) or personal multimedia players (PMPs). The present invention may be also applied to the below-described embodiments and modifications thereof.

The overall operation of the digital image processing apparatus is controlled by a CPU 100. The digital image processing apparatus includes an operation unit 200 including, for example, a key used by a user to generate an electric signal.

The electric signal from the operation unit 200 is transmitted to the CPU 100 so that the CPU 100 may control the digital image processing apparatus according to the electric signal.

In a photographing mode, as the electric signal generated by a user is applied to the CPU 100, the CPU 100 recognizes the electric signal and controls a lens driving unit 11, an aperture driving unit 21, and a photographing device control unit 31 so that the position of a lens 10, a degree of opening of the aperture 20, and sensitivity of the photographing device 30 may be controlled. The photographing device 30 generates data from input light. An analog-to-digital (A/D) converter 40 converts analog data output from the photographing device 30 into digital data. The A/D convert 40 may not be provided according to a characteristic of the photographing device 30.

Figure 2:
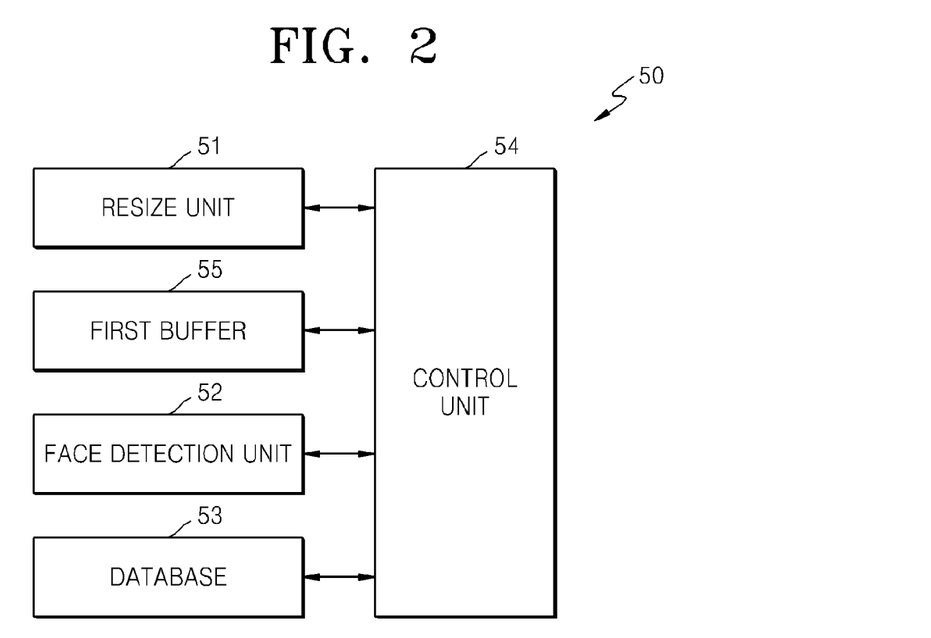
FIG. 2 is a detailed block diagram of an embodiment of the digital signal processing unit of FIG. 1.
Figure 3:
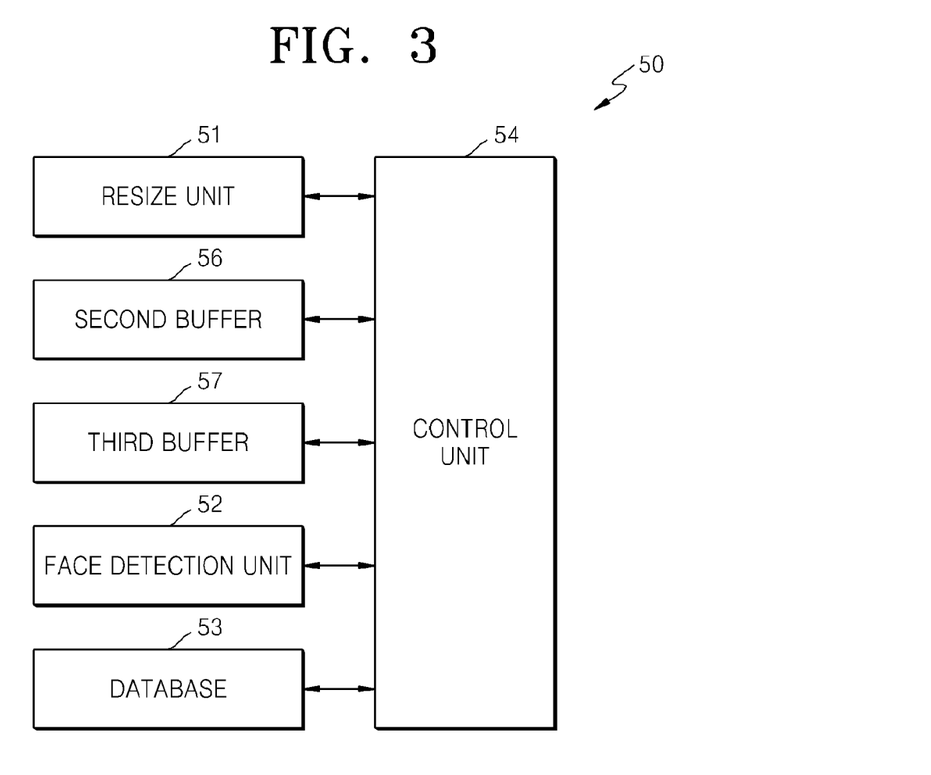
FIG. 3 is a detailed block diagram of another embodiment of the digital signal processing unit of FIG. 1.

The data output from the photographing device 30 may be input to a digital signal processing unit 50 via a memory 60 or without passing through the memory 60, or input to the CPU 100 when necessary. The memory 60 includes a ROM or RAM. The digital signal processing unit 50 may perform digital signal processing such as gamma correction or white balance change as necessary. Also, as illustrated in FIGS. 2 and 3, the digital signal processing unit 50 may include constituent elements such as a resize unit 51, a face detection unit 52, a database 53, a control unit 54, and first to third buffers 55, 56, and 57. The resize unit 51, the face detection unit 52, the database 53, the control unit 54, and the first to third buffers 55, 56, and 57 may be additional elements, not the constituent elements of the digital signal processing unit 50, and other modifications thereof is available. That is, it is sufficient that the digital image processing apparatus for improving a face recognition ratio according to the present embodiment includes the resize unit 51, the face detection unit 52, the database 53, the control unit 54, and the first to third buffers 55, 56, and 57. The operations of the resize unit 51, the face detection unit 52, the database 53, the control unit 54, and the first to third buffers 55, 56, and 57 are described later.

An image obtained from the data output from the digital signal processing unit 50 is transferred to a display control unit 81 via the memory 60 or directly. The display control unit 81 controls a display unit 80 to display the image on the display unit 80. The display unit 80 may be a touch screen. The data output from the digital signal processing unit 50 is input to a storing/reading control unit 71 via the memory 60 or directly. The storing/reading control unit 71 stores the image data in a storage medium 70 automatically or according to a signal generated by a user. The storing/reading control unit 71 may read data from an image file stored in the storage medium 70 and input the read data to the display control unit 81 via the memory 60 or via other route so that the image may be displayed on the display unit 80. The storage medium 70 may be detachable or permanently installed in the digital image processing apparatus.

The function of the digital signal processing unit 50 according to an embodiment of the present invention is described with reference to FIG. 2.

The digital signal processing unit 50 according to the present embodiment generates a first image having a different size from that of a live-view image. When the size of a face detected from the first image is smaller than a reference size, information on the face detected from the first image is mapped on the live-view image to perform smile and/or blink recognition. The digital signal processing unit 50 includes the resize unit 51, the face detection unit 52, the database 53, the control unit 54, and the first buffer 55 as a storing unit.

The live-view image displayed on the display unit 80 has a size of 960×240, for example. The live-view image is updated every 33 ms to be displayed on the display unit 80.

The resize unit 51 converts the size of the live-view image displayed on the display unit 80 into a smaller size, generates a first image, and stores a generated first image in the first buffer 55. For example, the size of the first image that is resized may be 320×240. When the sizes of the resized first image and the live-view image are compared with each other, it may be seen that a ratio in the size between the images is 1:3.

The face detection unit 52 detects a face from the first image stored in the first buffer 55 and calculates face detection coordinates. The face detection unit 52 investigates permanent characteristics of a face, for example, facial elements such as eyes, nose, and mouth, texture, and skin color, in a characteristic based face detection method, and calculates face characteristic coordinates. Of the various characteristics of a face, the skin color that is less sensitive to a change in movement, rotation, and size of a face, is a most used method.

In the face template based detection method of the face detection method by the face detection unit 52, several standard patterns are generated about a face and then the patterns are stored for face detection. Then, the patterns are compared one by one to an image in a search window so that a face is detected. As a method for face detection, a face detection method based on the support vector machine (SVM) is widely used. According to the SVM based method, other different areas are sub-sampled from an image and a face and a non-face (a portion that is not a face) are studied through a study apparatus, and then a face is identified from an input image. Since the content about the face information detection of the face detection unit 52 is already known well, a detailed description is omitted herein.

The database 53 stores at least one face detection information, smile detection information, and blink detection information. A variety of face detection sizes are stored as the face detection information. The minimum face detection size is, for example, 14×14. When the detected face size is smaller than the minimum face detection size, face detection fails. A variety of smile and/or blink detection sizes are stored as the smile and/or blink detection information. The minimum smile and/or blink detection size is, for example, 20×20. When the detected smile and/or blink size is smaller than the minimum smile and/or blink detection size, smile and/or blink detection fails. Also, the database 53 stores a variety of smiling mouth images for smile recognition as smile information and a variety of closed eye images for blink recognition as blink information.

When the size of a face detected from the first image is smaller than a reference face size, the control unit 54 maps the face coordinates of the resized first image on the live-view image and performs smile and/or blink recognition from the live-view image. The reference face size may be the minimum smile and/or blink detection size, for example, 40×40.

When the size of a face detected from the resized first image is smaller than the minimum face detection size, for example, 14×14, the control unit 54 fails even the face detection. Also, even when the size of a face detected from the resized first image is larger than the size of 14×14, if the size of a face detected from the resized first image for the smile and/or blink detection is smaller than or equal to the size of 20×20, the control unit 54 may not detect the smile and/or blink.

Thus, when the size of a face detected from the resized first image is smaller than the reference size, the control unit 54 performs smile and/or blink recognition from a face of the live-view image calculated by mapping the face coordinates of the resized first image on the live-view image. As described above, the ratio in the size between the resized first image and the live-view image is 1:3. Accordingly, assuming that the face coordinates of the resized first image start from (10, 10), the face coordinates transferred to the live-view image are (30, 10). Thus, the face coordinates may be identified from the live-view image so that the smile and/or blink may be recognized from the face in the live-view image.

The control unit 54 performs the smile recognition by calculating only image coordinates corresponding to the mouth of the face characteristic coordinates of the first image to fit to the live-view image, and comparing the mouth of the face characteristic coordinates of the first image with a variety of the smiling mouth images stored in the database 53. Also, the control unit 54 performs blink recognition by calculating only image coordinates corresponding to the eye of the face characteristic coordinates of the first image to fit to the live-view image, and comparing the eye of the face characteristic coordinates of the first image with a variety of the closed eye images stored in the database 53.

The function of the digital signal processing unit 50 according to another embodiment is described with reference to FIG. 3. The digital signal processing unit 50 generates at least two images having sizes different from that of the live-view image. When the size of a face detected from one of the generated images is smaller than a reference size, a face detected from the other one of the generated images is displayed to perform smile and/or blink recognition. The digital signal processing unit 50 includes the resize unit 51, the face detection unit 52, the database 53, the control unit 54, and the second buffer 56 and the third buffer 57 as the storing unit. The number of buffers is not limited to two and more buffers may be added within a range in which a signal processing speed is not decreased.

The live-view image displayed on the display unit 80 has a size of, for example, 960×240. The resize unit 51 generates first and second images by converting the size of the live-view image displayed on the display unit 80 into a smaller size and respectively stores generated first and second images in the first and second buffers 56 and 57. For example, the size of the resized first image may be 640×240 and the size of the resized second image may be 320×240.

When the size of the resized first image and the size of the live-view image are compared with each other, it may be seen that a ratio in the size between the images is 1:2. When the size of the resized second image and the size of the live-view image are compared with each other, it may be seen that a ratio in the size between the images is 1:3.

The face detection unit 52 detects a face from the first and second images stored in the second and third buffers 56 and 57 and calculates face detection coordinates. Also, the face detection unit 52 investigates the permanent characteristics of a face, for example, facial elements such as eyes, nose, and mouth, texture, and skin color, in a characteristic based face detection method, and calculates face characteristic coordinates.

The database 53 stores at least one of face detection information, smile detection information, and blink detection information. A variety of face detection sizes are stored as the face detection information. The minimum face detection size is, for example, 14×14. When the detected face size is smaller than the minimum face detection size, face detection fails. A variety of smile and/or blink detection sizes are stored as the smile and/or blink detection information. The minimum smile and/or blink detection size is, for example, 20×20. When the detected smile and/or blink size is smaller than the minimum smile and/or blink detection size, smile and/or blink detection fails. Also, the database 53 stores a variety of smiling mouth images for smile recognition as smile information and a variety of closed eye images for blink recognition as blink information.

When the size of a face detected from the second image is smaller than a reference face size, the control unit 54 detects a face from the first image stored in the second buffer 56 and displays a detected face on the display unit 80. The reference face size may be the minimum smile and/or blink detection size, for example, 40×40. When the size of a face detected from the second image is smaller than the minimum face detection size, for example, 14×14, the control unit 54 fails even the face detection. Also, even when the size of a face detected from the second image is larger than the size of 14×14, if the size of a face detected from the second image for the smile and/or blink detection is smaller than or equal to the size of 20×20, the control unit 54 may not detect the smile and/or blink.

Thus, when the size of a face detected from the second image is smaller than the reference size, the control unit 54 displays the face detected from the first image on the display unit 80. As described above, the ratio in the size between the first and second images is 1:2. Accordingly, assuming that the face coordinates of the second image start from (10, 10), for example, the face coordinates transferred to the live-view image are (30, 10).

Figure 4A:
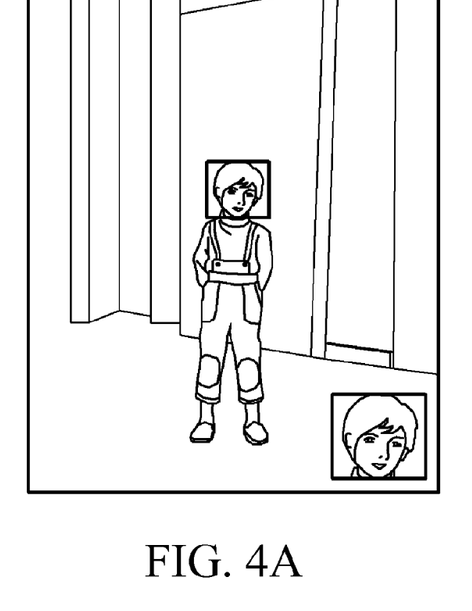
FIGS. 4A and 4B are pictorial images that illustrate an improved face recognition ratio of FIG. 3.
Figure 4B:
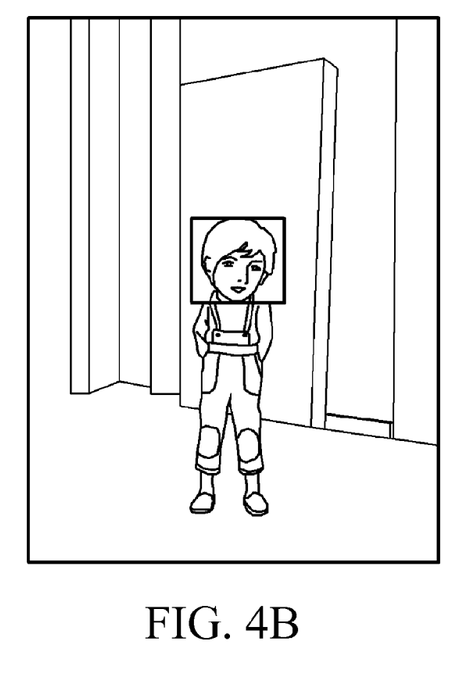

The control unit 54 displays the face detected from the first image on the display unit 80. The detected face may be displayed in a certain area of the live-view image as illustrated in FIG. 4A, or displayed by being overlapped on the face in the live-view image as illustrated in FIG. 4B. Thus, since the size of a face in the live-view image increases, the smile and/blink detection may be easily performed.

The control unit 54 performs the smile recognition by comparing image coordinates corresponding to the mouth of the face characteristic coordinates of the first image, with the smiling mouth images stored in the database 53. Also, the control unit 54 performs the blink recognition by comparing image coordinates corresponding to the eye of the face characteristic coordinates of the first image, with the closed eye images stored in the database 53.

When the size of a face detected from the second image is larger than or equal to the reference face size, the control unit 54 detects a face from the second image and displays a detected face on the display unit 80. The control unit 54 performs the smile recognition by comparing image coordinates corresponding to the mouth of the face characteristic coordinates of the second image, with the smiling mouth images stored in the database 53. Also, the control unit 54 performs the blink recognition by comparing image coordinates corresponding to the eye of the face characteristic coordinates of the second image, with the closed eye images stored in the database 53.

A method for improving a face recognition ratio according to an embodiment of the present invention is described in detail with reference to FIGS. 5 and 6. The face recognition ratio improving method may be performed in a digital image processing apparatus as illustrated in FIG. 1. A main algorithm of the method may be performed in the digital signal processing unit 50 with the help of peripheral devices of the digital image processing apparatus.

Figure 5:
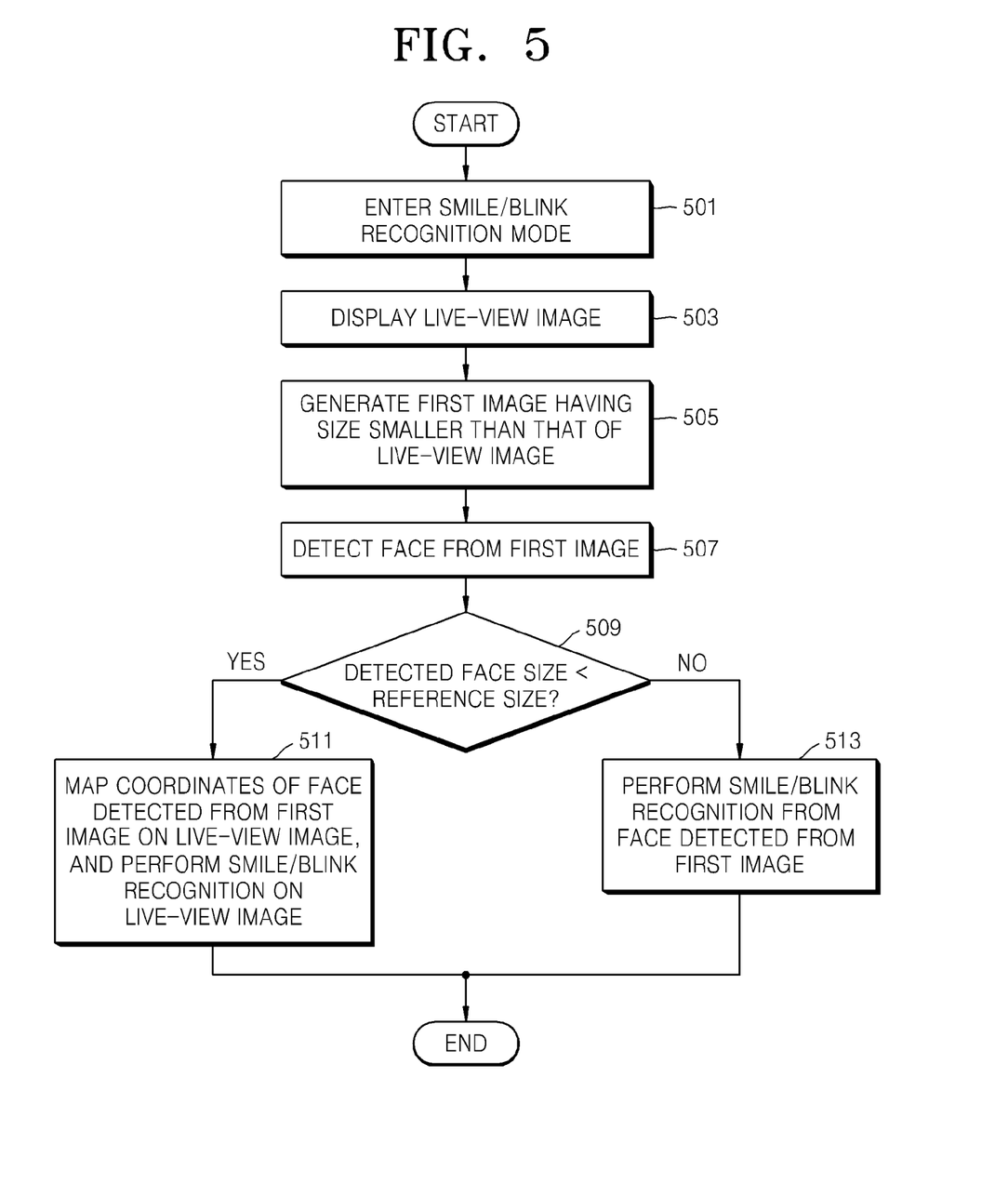
FIG. 5 is a flowchart for explaining the operation of a method for improving a face recognition ratio according to an embodiment of the present invention.

Referring to FIG. 5, in the method for improving a face recognition ratio according to an embodiment of the present invention, a digital image processing apparatus enters a smile and/or blink recognition mode (Operation 501). The digital signal processing unit 50 displays a live-view image having a size of, for example, 960×240, on the display unit 80 (Operation 503).

When the live-view image is displayed, the digital signal processing unit 50 resizes the live-view image to generate a first image for face detection (FD). For example, the live-view image of a 960×240 size is resized to generate a first image of a 320×240 size (Operation 505).

When the resize of the first image for FD is completed, the digital signal processing unit 50 detects a face from the first image for FD (Operation 507). The minimum size of a face detected using the first image for FD is, for example, 14×14.

Next, the digital signal processing unit 50 determines whether the size of a face detected from the first image for FD is smaller than the reference size (Operation 509). For example, since the digital signal processing unit 50 may set the reference size in the smile and/or blink detection to be 40×40, if the size of a face detected from the first image for FD is smaller than or equal to the size of 40×40, the smile and/or blink detection is impossible.

As a result of the determination, when the size of a face detected from the first image for FD is smaller than the reference size and thus the smile and/or blink detection is impossible, the face coordinates found in the first image for FD are mapped over the live-view image and the smile and/or blink recognition is performed with respect to the live-view image (Operation 511). As a result of the determination, when the first image for FD is larger than or equal to the reference size, the digital signal processing unit 50 performs the smile and/or blink recognition on the first image for FD (Operation 513).

Figure 6:
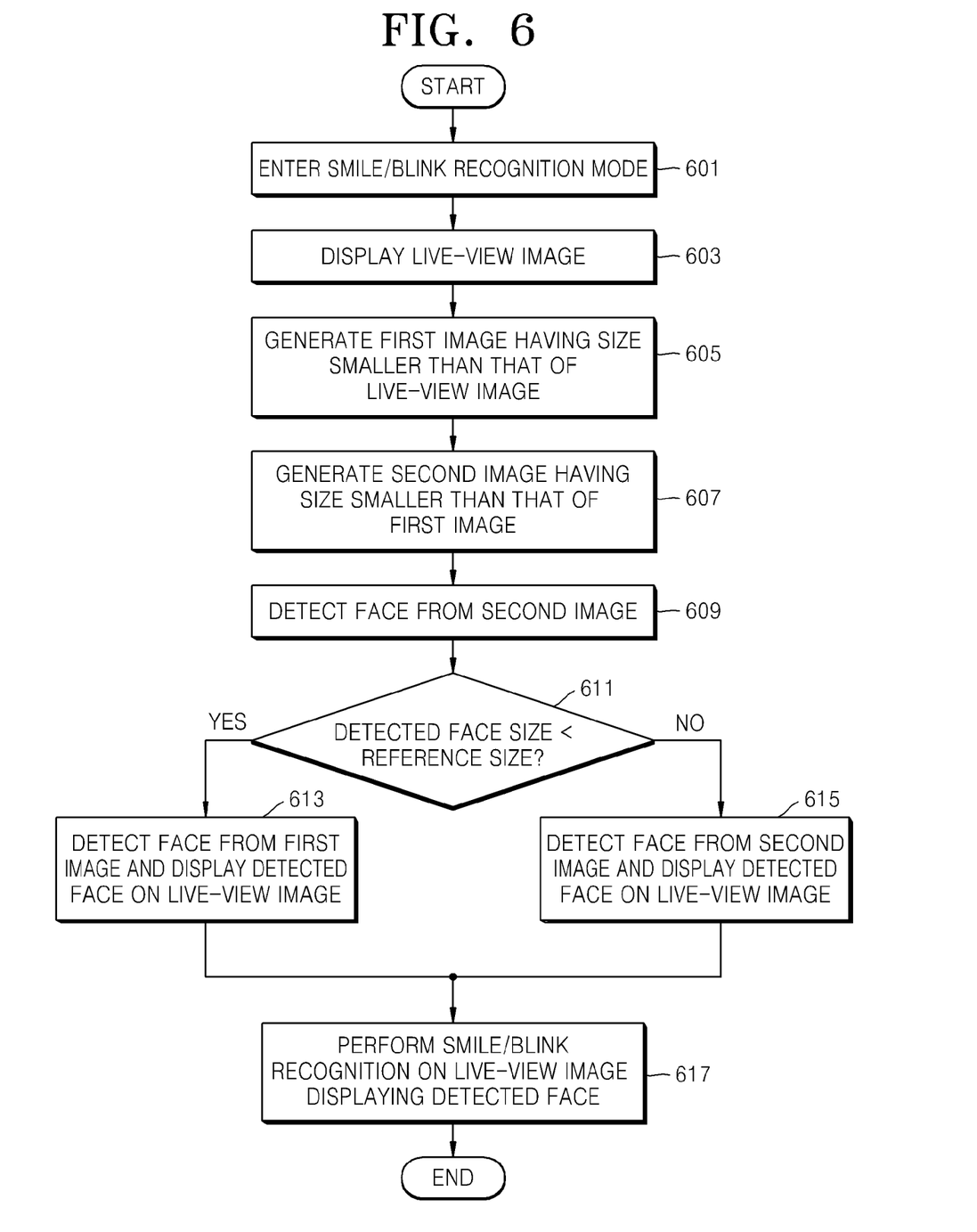
FIG. 6 is a flowchart for explaining the operation of a method for improving a face recognition ratio according to another embodiment of the present invention.

Referring to FIG. 6, in a method for improving a face recognition ratio according to another embodiment of the present invention, when a digital image processing apparatus enters a smile and/or blink recognition mode (Operation 601), the digital signal processing unit 50 displays a live-view image having a size of, for example, 960×240, on the display unit 80 (Operation 603).

When the live-view image is displayed, the digital signal processing unit 50 resizes the live-view image to generate a first image. For example, the live-view image of a 960×240 size is resized to generate a first image of a 320×240 size (Operation 605).

When the generation of the first image is completed, the digital signal processing unit 50 resizes the first image to generate a second image. For example, the first image of a 640×240 size is resized to generate a second image of a 320×240 size (Operation 607).

When the generation of the first and second images is completed, the digital signal processing unit 50 detects a face from the second image (Operation 609). The minimum size of a face detected using the second image is, for example, 14×14.

Next, the digital signal processing unit 50 determines whether the size of a face detected from the second image is smaller than the reference size (Operation 611). For example, the digital signal processing unit 50 may set the reference size in the smile and/or blink detection to be 40×40. If the size of a face detected from the second image is smaller than or equal to the size of 40×40, the smile and/or blink detection is impossible.

As a result of the determination, when the size of a face detected from the second image is smaller than the reference size, the digital signal processing unit 50 detects a face from the first image and displays a detected face on the live-view image (Operation 613). The reference size may be the minimum smile and/or blink detection size, for example, a 40×40 size.

As a result of the determination, when the size of a face detected from the second image is larger than or equal to the reference size, the digital signal processing unit 50 detects a face from the second image and displays a detected face on the live-view image (Operation 615). While displaying the face detected from the first or second image on the display unit 80, the digital signal processing unit 50 may display the detected face in a certain area of the live-view image as illustrated in FIG. 4A, or display the detected face by overlapping the detected face on the face in the live-view image as illustrated in FIG. 4B.

The digital signal processing unit 50 performs the smile and/or blink recognition on the live-view image displaying the detected face (Operation 617). The digital signal processing unit 50 performs the smiles recognition by comparing image coordinates corresponding to the mouth of the face characteristic coordinates of the first or second image displayed on the live-view image, with the smiling mouth images stored in the database 53. Also, the digital signal processing unit 50 performs the blink recognition by comparing image coordinates corresponding to the eye of the face characteristic coordinates of the first or second image displayed on the live-view image, with the closed eye images stored in the database 53.

As described above, according to the one or more of the above embodiments of the present invention, since a face recognition ratio is improved, a smile and/or blink is easily detected so that an image photographing success rate may be improved.

Any of the device computers may comprise a processor, a memory for storing program data and executing it, a permanent storage such as a disk drive, a communications port for handling communications with external devices, and user interface devices. When software modules are involved, which may implement various above-described functions, these software modules may be stored as program instructions or computer readable codes executable on the processor on a computer-readable media such as read-only memory (ROM), random-access memory (RAM), CD-ROMs, magnetic tapes, floppy disks, and optical data storage devices. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. An apparatus for improving a face recognition ratio, the apparatus comprising a digital signal processor that:
   generates a live-view image at a first point in time;
   resizes the live-view image to generate a first image;
   stores the first image in a first buffer;
   updates the live-view image at a second point in time;
   if a pixel area of a face detected from the first image is less than a reference pixel area, maps information about the face detected from the first image on the updated live-view image based on a ratio between a pixel area of the first image and a pixel area of the updated live-view image, and performs at least one of smile and blink recognition on the updated live-view image; and otherwise,
   if the pixel area of the face detected from the first image is greater than or equal to the reference pixel area,
   performs at least one of smile and blink recognition on the first image, wherein the pixel area of the first image is less than the pixel are of the live-view image.

2. The apparatus of claim 1, wherein the digital signal processor comprises:
   a resize unit that resizes the live-view image into the first image;
   a face detection unit that detects a face from the first image and calculates coordinates of the detected face and coordinates of a characteristic of the detected face; and
   a control unit that maps the information about the face detected from the first image on the live-view image and performs at least one of smile and blink recognition from the live-view image.

3. The apparatus of claim 2, further comprising a database that stores at least one of face detection information, smile detection information, and blink detection information.

4. The apparatus of claim 3, wherein the control unit performs at least one of smile and blink recognition by comparing a face of the live-view image mapped with the coordinates of a face and a characteristic of the first image, with information about detection of at least one of a smile and or blink stored in the database.

5. An apparatus for improving a face recognition ratio, the apparatus carrying out steps comprising a digital signal processor that:
   generates a live-view image at a first point in time;
   resizes the live-view image to generate a first image,
   resizes the first image to generate a second image;
   stores the first image in a first buffer;
   stores the second image in a second buffer;
   updates the live-view image at a second point in time;
   wherein the pixel area of the first image is less than that of the live-view image and the pixel area of the second image is less than that of the live-view image;
   if a pixel area of a face detected from the second image is less than a reference pixel area, displays a face detected from the first image within the updated live-view image overlapping a face of the updated live-view image, and
   performs at least one of a smile and blink recognition on the updated live-view image;
   otherwise,
   if the pixel area of the face detected from the second image is greater than or equal to the reference pixel area,
   displays the face detected from the second image within the updated live-view image overlapping a face of the updated live-view image, and
   performs at least one of a smile and blink recognition on the updated live-view image.

6. The apparatus of claim 5, wherein the digital signal processor comprises:
   a resize unit that resizes the live-view image into the first image and into the second image;
   a face detection unit that detects the face from the first image, detects the face from the second image, and calculates coordinates of the detected face and coordinates of a characteristic of the detected face; and
   a control unit that displays the face detected from the first image in the updated live-view image if the pixel area of the face detected from the second image is less than the reference pixel area, displays the face detected from the second image in the updated live-view image if the pixel area of the face detected from the second image is less than or equal to the reference pixel area, and performs at least one of the smile and blink recognition.

7. The apparatus of claim 6, further comprising a database which stores at least one of face detection information, smile detection information, and blink detection information.

8. The apparatus of claim 7, wherein the control unit performs at least one of the smile and blink recognition by comparing coordinates of a face and a characteristic of the first or second image displayed on the live-view image, with information about detection of at least one of a smile and blink that is previously stored in the database.

9. A method for improving a face recognition ratio, the method comprising:
   generating a live-view image at a first point in time;
   resizing the live-view image to generate a first image;
   storing the first image in a first buffer;
   updating the live-view image at a second point in time;
   performing at least one of a smile and blink recognition on the updated live-view image by mapping information about a face detected from the first image on the updated live-view image based on a ratio between a pixel area of the first image and a pixel area of the updated live-view image when a pixel area of a face detected from the first image is smaller than a reference pixel area; and otherwise
   performing at least one of the smile and blink recognition on the first image when the pixel area of the face detected from the first image is greater than the reference pixel area,
   wherein the pixel area of the first image is less than the pixel area of the live-view image.

10. The method of claim 9, wherein the at least one of the smile and blink recognition is performed by comparing the face of the live-view image mapped with the coordinates of the face and a characteristic of the first image, with information about at least one of detection of a smile and detection of a blink stored in a database.

11. A method for improving a face recognition ratio, the method comprising:
   generating a live-view image at a first point in time
   resizing the live-view image to generate a first image, wherein the pixel area of the first image is less than that of the live-view image and the pixel area of the second image is less than that of the live-view image;
   resizing the first image to generate a second image;
   storing the first image in a first buffer;
   storing the second image in a second buffer;
   updating the live-view image at a second point in time;
   performing at least one of a smile and blink recognition on the updated live-view image by displaying a face detected from the first image within the updated live-view image overlapping a face of the updated live-view image if a pixel area of a face detected from the second image is less than a reference pixel area; and
   otherwise
   performing the at least one of the smile and blink recognition on the updated live-view image by displaying the face detected from the second image within the updated live-view image overlapping a face of the updated live-view image if the pixel area of the face detected from the second image is greater than or equal to the reference pixel area.

* * * * *